United States Patent [19]
Wren et al.

[11] 3,843,818
[45] Oct. 22, 1974

[54] PROCESS FOR PRODUCING LOW CALORIE PASTA
[75] Inventors: Martha A. Wren; Joseph D. Mullen, both of Minneapolis, Minn.
[73] Assignee: General Mills, Inc., Minneapolis, Minn.
[22] Filed: Dec. 13, 1972
[21] Appl. No.: 314,657

[52] U.S. Cl............... 426/346, 426/158, 426/451, 426/804
[51] Int. Cl.............................................. A23c 1/16
[58] Field of Search ............ 426/804, 158, 451, 213

[56] References Cited
UNITED STATES PATENTS
3,537,862  11/1970  Peters et al..................... 426/158 X
3,574,634  4/1971  Singer................................. 426/158
3,615,677  10/1971  Scharschmidt.................. 426/158 X Primary Examiner—Raymond N. Jones
Attorney, Agent, or Firm—Anthony A. Juettner; Gene O. Enockson

[57] ABSTRACT

A method is disclosed for preparing a low calorie pasta. A mixture is formed including polygalactomannan gum, cereal material, vegetable protein and water. The mixture is worked in an extruder at a critical temperature of between about 55° and 98°C. and then extruded to form the pasta.

7 Claims, No Drawings

PROCESS FOR PRODUCING LOW CALORIE PASTA

The present invention relates to food products and more particularly to a method for preparing low calorie pasta products.

Control of caloric intake has become an ever-increasing concern for many people. For this reason low calorie food products are commonly found on grocery store shelves. In some instances calorie reduction per serving is obtained merely by reducing the size of the edible portion, for example, thin sliced bread. However, in most instances calorie reduction is obtained by including a non-assimilable material in the food product. The non-assimilable material may be provided for flavoring purposes or for bulking purposes.

Flavoring replacement is illustrated in the case where sugar, which is a nutritive sweetener, is replaced in whole or in part by saccharin, a non-nutritive sweetener.

The present invention relates to providing pasta products such as macaroni, spaghetti, noodles and the like, in which bulk is increased with polygalactomannan gum and with increased water content in the final cooked pasta product. The moisture content of the final cooked product may, for example, be about 80 percent by weight. The present invention provides pasta products with excellent taste and textural characteristics and yet provides pasta products in which calorie content may be reduced 50 percent or more.

The present pasta includes from 15 to 50 percent polygalactomannan gum and from 85 to 50 percent of a mixture of vegetable protein and cereal material (dry weight basis). The term "polygalactomannan gum" as used herein includes the general class of polysaccharides containing both galactose and mannose units. The polygalactomannans are usually found in the endosperm sections of leguminous seeds such as guar, locust bean, honey locust, flametree and Cassia occidentalis. The polygalactomannan vegetable gum preferably is guar gum or locust beam gum. Alternatively, the vegetable gum may be a mixture of gums such as guar gum and locust beam gum, for example, a 1:1 mixture. The polygalactomannan gum may not be replaced with other gums since other types of gums will not work satisfactorily in the present invention. The gum is preferably present in an amount of about 25 to 35 percent, dry weight basis. The cereal material is preferably a flour such as durum flour; however, any cereal flour or starch may be used. The cereal material is preferably present in an amount of 8 to 40 percent by dry weight. The vegetable protein material may be, for example, vital gluten or soybean material (i.e., a concentrate or an isolate). Various other vegetable protein materials may be used such as cottonseed, peanut and sesame. Additional protein materials that may be used include casein, whey protein or egg white. The protein material is preferably present in an amount of 25 to 55 percent by dry weight. A tougher product may be provided by increasing the protein level and reducing the starch level whereas a softer product may be provided by decreasing the protein level and increasing the starch level. Various other materials may be added such as coloring material, flavoring material and protein or gluten relaxing agents such as cysteine and $NaHSO_3$. Additional materials that may be included are non-assimilable materials such as finely ground soybean hulls or oat hulls. Preferably soybean hulls are added. The soybean hulls reduce the slipperiness and improve the mouth feel of the final product. The hulls may be present in an amount of up to 5 percent dry weight basis.

The pasta product is prepared by adding sufficient water to raise the moisture content of the gum, flour and protein mixture to between 28 and 38 percent by weight. The resulting mixture is treated in an extruder and shaped as desired. The water may include some acid such as acetic acid for purposes of increasing the whiteness of the finished product and reducing the stickiness during processing. The acetic acid, for example, may be added in an amount of 0.5 to 1.0 percent based on the weight of the dry materials. During the treatment in the extruder, the temperature of the mixture must be raised to between 55° and 98°C. The preferred temperature range is 60° to 80°C. This temperature refers to product leaving the extruder. The heat can be generated through work in the extruder. The extrusion, however, should be at a temperature at which little, if any, expansion takes place due to vaporization of the moisture. The pasta product may be dried by conventional means. The pasta product may be cooked just prior to consumption by boiling in water for from about 7 to 30 minutes.

The following examples are for purposes of illustrating the present invention.

EXAMPLE I

A pasta product was prepared according to the present invention by dry blending the following: 175 parts guar flour, 175 parts durum wheat flour, 150 parts vital gluten, 0.5 part titanium dioxide and 0.2 part FDC No. 5 yellow color. The terms "parts" and "percent" as used herein will mean parts or percent by dry weight unless otherwise specified. The materials were continuously mixed in a Hobart mixer and 255 ml. of 2 percent acetic acid were added dropwise. The hydrated granular material was then treated in a Brabender extruder having a 20 to 1 ratio of length to diameter and a 4 to 1 compression ratio. The temperature in the extruder barrel was 50°C. in the zone closest to the feed port and 90°C. in the remainder of the barrel. The material leaving the extruder had a temperature of 85°C. The pasta maaterial was cut to length and dried under controlled humidity. The resulting product was cooked in boiling water for 10 minutes. The product had substantially greater water uptake than conventional 100 percent durum pasta and yet had a texture very much like conventional cooked pasta. Ten grams of the dry noodles were converted to 55 grams of hydrated material during the cooking. The same weight of conventional 100 percent durum pasta resulted in 35 grams of hydrated material upon identical cooking.

EXAMPLE II

The following materials were dry blended: 10.3 parts guar flour, 10.3 parts locust bean gum, 7.37 parts durum flour, 3.1 parts soy protein isolate[1], 28.11 parts vital gluten[2], 0.2 part titanium dioxide, 2.72 parts microcrystalline cellulose[3], 0.01 part FDC yellow No. 5, 0.03 part oleoresin of carrot (spray dried, water miscible) and 0.92 part silica[4]. Then 36.92 parts of water were added and the product was extruded as described in Example I. The product, after cooking, had the eating quality of conventional pasta and yet had a low calorie level and contained much more water than conventional pasta.

EXAMPLE III

A pasta product was prepared according to the present invention by dry blending the following materials:

|  | Parts by Weight |
| --- | --- |
| Guar flour | 51.1 |
| Locust bean gum | 51.5 |
| Durum flour | 73.7 |
| Soy protein isolate[1] | 31.0 |
| Vital gluten[2] | 281.1 |
| TiO$_2$ | 2.0 |
| Microcrystalline cellulose[3] | 27.2 |

The dry blend was then mixed with 369.4 parts of water in a Hobart mixer. The following materials were then added. Yellow No. 5 — 0.1 part; carrot color — 0.3 part; silica[4] — 9.2 parts; and bleached soy hulls[5] — 103 parts. The hydrated material was then treated in a Brabender extruder. The die was heated to 62°C. during start-up. The working of the dough by the screw was sufficient thereafter to maintain the temperature of the extrudate at 62° to 70°C. at the face of the die. The product was cooked in boiling water for 10 minutes. The cooked pasta had a texture and eating quality much like conventional pasta.

EXAMPLE IV

Pasta product was prepared according to the present invention by dry blending the following materials: 224.6 parts locust bean gum, 78.7 parts durum flour, 33.6 parts soy protein isolate[1], 304 parts vital gluten[2], 1.3 parts titanium dioxide and 29.5 parts microcrystalline cellulose[3]. Three hundred twenty parts of water, 6.4 parts glacial acetic acid and 0.5 parts carotene (10 percent solution) were added during continuous mixing in a Hobart mixer. The resulting mixture was treated in a Brabender extruder and extruded to form a pasta product. The extrusion temperature was 90°C. The product was cut and dried. Ten grams of the pasta was later cooked for 10 minutes in boiling water. The product was drained and found to weigh 52 grams. The resulting texture of the pasta was satisfactory.

EXAMPLE V

Pasta products V-A through V-F were prepared according to the present invention substantially as described in Example IV except the ingredients were as shown in the following table as parts by weight. The extrusion temperature was 80°C. Ten grams of the dried pasta were then cooked in water and drained. Satisfactory products were obtained.

Table

|  | V-A | V-B | V-C | V-D | V-E | V-F |
| --- | --- | --- | --- | --- | --- | --- |
| Guar gum | 87.5 | 87.5 | 87.5 | 87.5 | 47.5 | 47.5 |
| Locust bean gum | 87.5 | 87.5 | 87.5 | 87.5 | 47.5 | 47.5 |
| Durum flour | 175 | 165 | 155 | 152 | 175 | 175 |
| Soy protein isolate | 150 | 150 | 150 | 150 | 150 | 150 |
| TiO$_2$ | 1 | 1 | 1 | 1 | 1 | 1 |
| Microcrystalline cellulose | 23 | 33 | 43 | 46 | 23 | 23 |
| Riboflavin | 0.15 | 0.15 | 0.15 | 0.15 | 0.15 | 0.15 |
| Glacial acetic acid | 5 | 5 | 5 | 5 | 5 | 5 |
| Water | 250 | 250 | 250 | 250 | 250 | 250 |
| Soy hulls (ground)[5] | — | — | — | — | 80 | — |
| Oat hulls (ground) | — | — | — | — | — | 80 |

[1] Profam 90, product of Grain Processing Co. Inc. of Muscatine, Iowa.
[2] ProVim, product of General Mills, Inc.
[3] Avicel, product of FMC Corporation
[4] Cabosil, product of Cabot Corporation.
[5] The soybean hulls were finely ground so that 100 percent passed through a No. 100 mesh ASTM screen and 40 percent passed through a No. 325 mesh ASTM screen.

The embodiments of the invention in which an exclusive property or privilege is claimed are defined as follows:

1. A method for preparing a low calorie pasta comprising mixing from 15 to 50 parts of polygalactomannan gum and from 85 to 50 parts of a mixture of vegetable protein and cereal material, dry weight basis;
   adjusting the moisture content to between 28 and 38 percent by weight to provide a hydrated mixture;
   working the hydrated mixture in an extruder and raising the temperature of the material to be between 55° and 98°C.; and
   extruding the worked mixture to form a pasta.

2. The method of claim 1 wherein the gum is at least one member of the group consisting of guar gum and locust bean gum.

3. The method of claim 1 wherein the cereal material is durum flour.

4. The method of claim 1 wherein the gum is a mixture of guar gum and locust bean gum.

5. The method of claim 4 wherein the vegetable gum mixture is a 1:1 mixture of guar gum and locust bean gum.

6. The method of claim 1 including the step of adding acetic acid to said mixture.

7. The method of claim 1 including the step of adding ground soybean hulls to said mixture.

* * * * *